United States Patent [19]

Izawa et al.

[11] Patent Number: 5,251,204
[45] Date of Patent: Oct. 5, 1993

[54] TRANSMISSION TEST SYSTEM IN A BROADBAND ISDN

[75] Inventors: Naoyuki Izawa, Mitaka; Shuji Yoshimura; Satoshi Kakuma, both of Kawasaki, all of Japan

[73] Assignee: Fujitsu Limited, Kawasaki, Japan

[21] Appl. No.: 762,338

[22] Filed: Sep. 19, 1991

[30] Foreign Application Priority Data

Sep. 19, 1990 [JP] Japan .................................. 2-247287

[51] Int. Cl.⁵ .............................................. H04J 3/14
[52] U.S. Cl. .............................. 370/15; 370/13; 370/14; 379/5; 371/20.1; 371/20.4; 371/20.5
[58] Field of Search ........................ 370/13, 14, 15; 371/20.1, 20.4, 20.5; 379/5

[56] References Cited

U.S. PATENT DOCUMENTS 4,486,877 12/1984 Turner .................................. 370/15
5,060,226 11/1991 Gewin et al. ........................ 370/15

*Primary Examiner*—Douglas W. Olms
*Assistant Examiner*—Russell W. Blum
*Attorney, Agent, or Firm*—Staas & Halsey

[57] ABSTRACT

The present invention relates to a transmission line test method in the broadband ISDN for assembling an ATM formatted cell into a frame and sending it in the synchronous optical network (SONET) formatted transmission line as a protocol of an optical fiber communication network. First, test data are inserted into an ATM cell according to a command of the central controlling unit in an ATM switching unit. Then, the test cell is sent through an ATM switch in the ATM switching unit after the insertion of the test data; the test data are extracted from the test cell turned around by an ATM layer provided between the ATM switch and the SONET-formatted transmission line or by a subscriber terminal adapter, or from the test frame (including the test cell) turned around by a terminator in the SONET-formatted transmission line or by a network terminator at a subscriber terminal in the transmission line; and finally a transmission test is conducted by checking the data in the line up to each turnaround point.

9 Claims, 12 Drawing Sheets

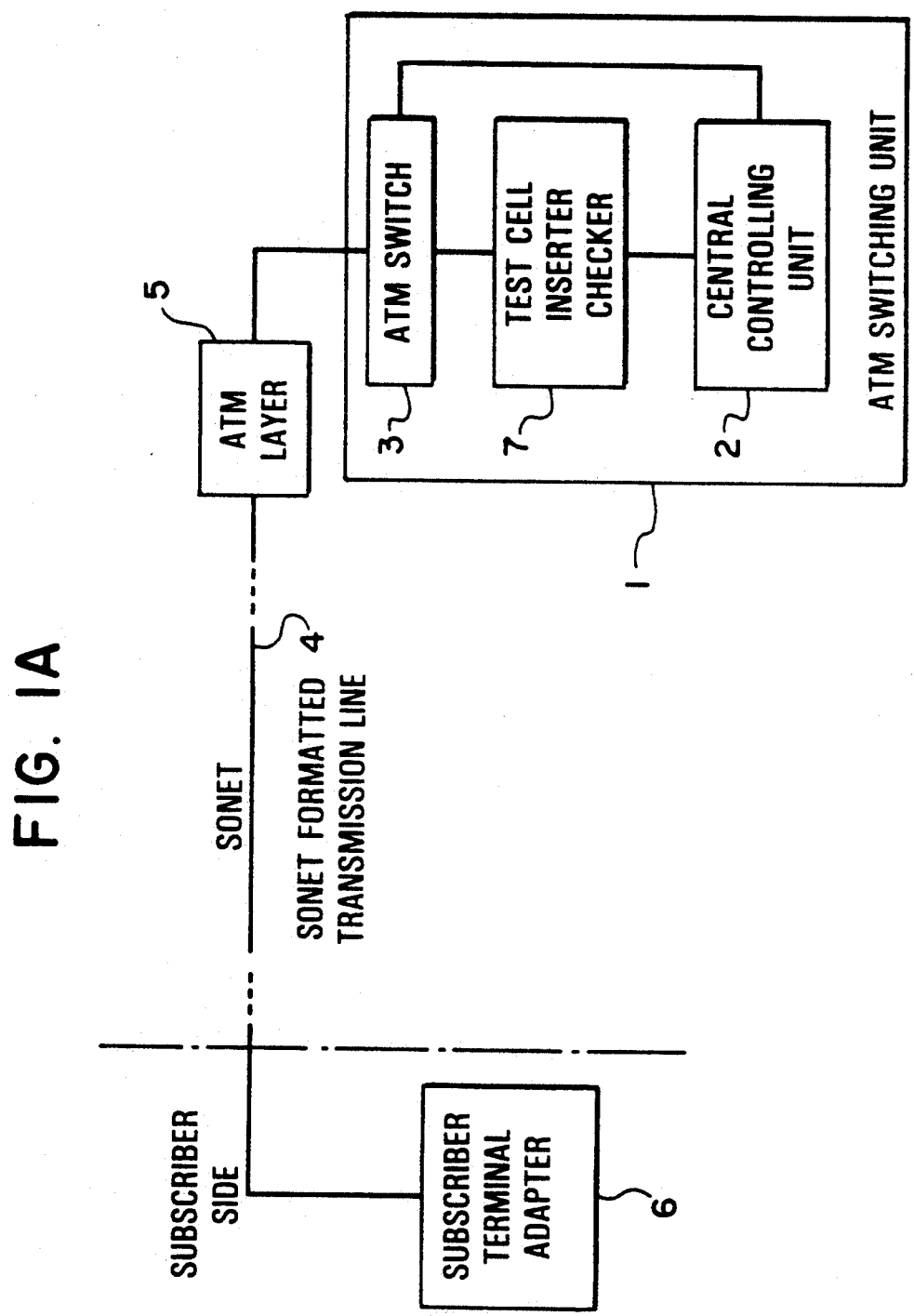

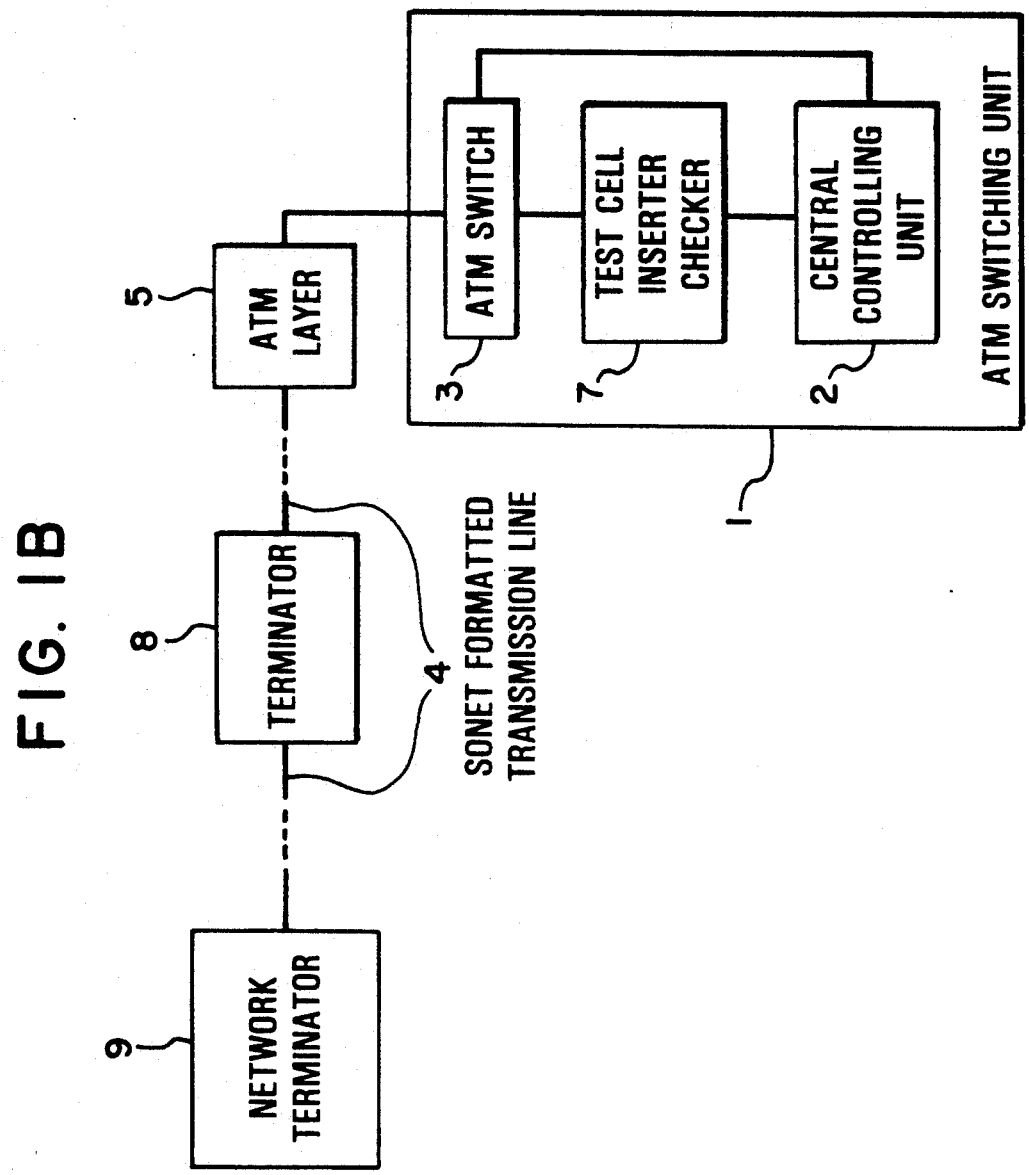

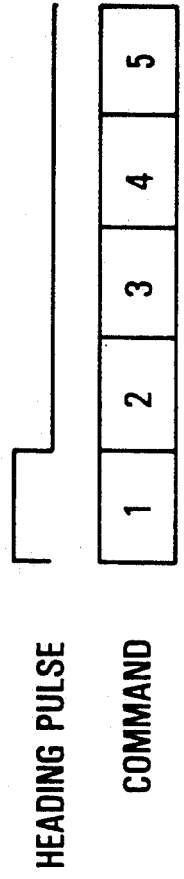
FIG. IIA
HEADING PULSE
COMMAND
FIG. IIB
| COMMAND BIT | POLARITY | FUNCTION |
|---|---|---|
| 1 | HIGHT VALID | SENDING A TEST CELL FROM A TEST DATA INSERTER |
| 2 | HIGHT VALID | TURNING AROUND A TEST CELL AT AN ATM LAYER |
| 3 | HIGHT VALID | TURNING AROUND A TEST FRAME AT A TERMINATOR |
| 4 | HIGHT VALID | TURNING AROUND A TEST FRAME AT A NT |
| 5 | HIGHT VALID | TURNING AROUND A TEST CELL AT A TA |

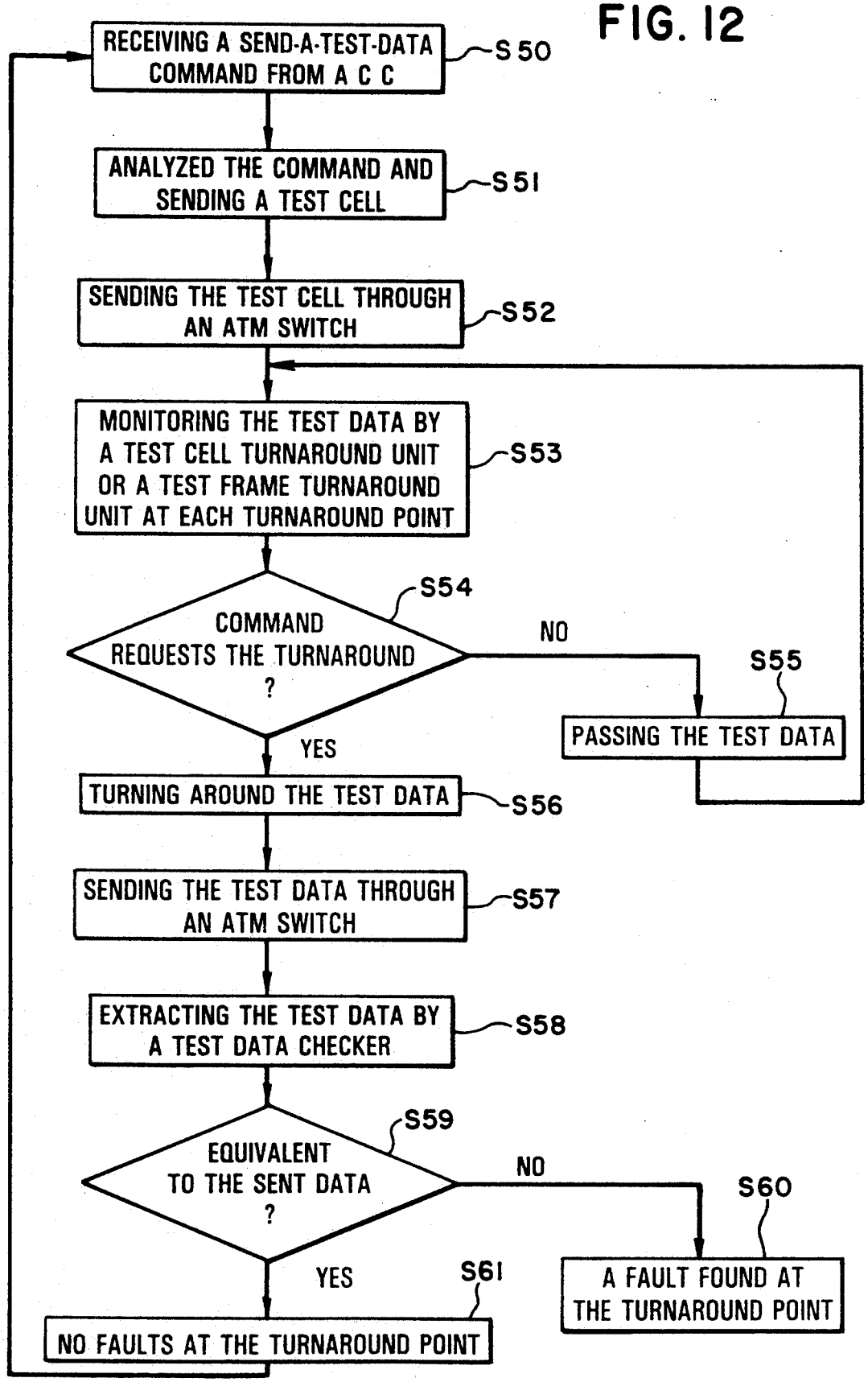

TRANSMISSION TEST SYSTEM IN A BROADBAND ISDN

BACKGROUND OF THE INVENTION

The present invention relates to a transmission line test system, and more specifically to a transmission line test system in a broadband ISDN where frames of cells are transmitted in the asynchronous transmission mode (ATM) through transmission lines in the synchronous optical network (SONET) to provide an optical fiber communication network protocol.

Lately, with the expansion of data communication, valuable data as well as voice has been transmitted through public line. Therefore, a high quality data transmission in a communication network is being demanded for the future. A broadband ISDN (B-ISDN) has been developed and standardized to be used with various interfaces for practical use as a communication service network capable of transmitting not only voice and low speed data, but such high speed data as animation, etc. In the B-ISDN, unlike an ordinary switch system, information to be transmitted at a different speed such as voice, low speed data, animation, etc. can be processed collectively in an asynchronous transmission mode (ATM) and continuous information, and burst information can also be processed in the same system.

In the ATM network, data in different bands are contained in a fixed length unit, which is called "cell" to be distinguished from an ordinary packet, and then transmitted or switched. In this system, as data are multiplexed in cells without distinguishing line data from packet data, various services can be offered where different transmission speeds are required, thereby the transmission line can be utilized efficiently.

In the ATM communication, user information is divided into a plurality of parts of appropriate length, each being added a header to form a cell. A header part of a cell comprises, for example, a few bytes, and a data part comprises 32-120 bytes. A channel identifier (VCI) is added to a header to identify a source user. The user information is multiplexed after being formed into a cell, and then transmitted or switched in an ATM highway.

A processor of a switching unit specifies, according to a channel identifier, to which buffer in the switch of a switching unit the cell data should be written. Cell data are called "self-routing data" because they are transmitted autonomously in a network. On the receiving side, a necessary cell can be extracted from an ATM highway according to a channel identifier, and user information can be extracted by removing a header.

In the broadband ISDN switch network, a transmission line in the synchronous optical network (SONET) format is adopted as a transmission means as an optical fiber communication network protocol, for example. In the SONET transmission line, a number of ATM cells are grouped and transmitted in a frame.

In the broadband ISDN as described above, however, an efficient transmission line test method has not been established yet to determine whether or not data are transmitted correctly. Besides, there is a problem that a transmission line test must be conducted using ATM cells or SONET-formatted testframes (including a test cell) selected according to the kind of data to be tested.

SUMMARY OF THE INVENTION

An object of the present invention is to conduct a transmission line test distinguishably by using ATM cells "as is" or by using SONET test-frames.

A feature of the present invention resides in a transmission test system for use in a broadband ISDN using an asynchronous transmission mode (ATM) switching unit in a broadband ISDN comprising: a test cell inserting/checking means for inserting test data to an ATM cell according to a command of a central controlling unit of said ATM switching unit, sending said test cell after the insertion of said test data through an ATM switch in said ATM switching unit, and for checking the test data turned around by an ATM layer provided between said ATM switch and a synchronous optical network (SONET) formatted transmission line or by a subscriber terminal adapter, wherein an on-line transmission test is conducted during the operation of said ATM switching unit.

BRIEF DESCRIPTION OF THE DRAWINGS

FIG. 1A shows a block diagram for explaining the first principle;

FIG. 1B shows a block diagram for explaining the second principle;

FIG. 11 shows an explanatory view for a format of an embodiment of the turnaround command; and FIG. 12 shows a flowchart of an embodiment of a transmission test method;

PREFERRED EMBODIMENT OF THE PRESENT INVENTION

Figure 2:
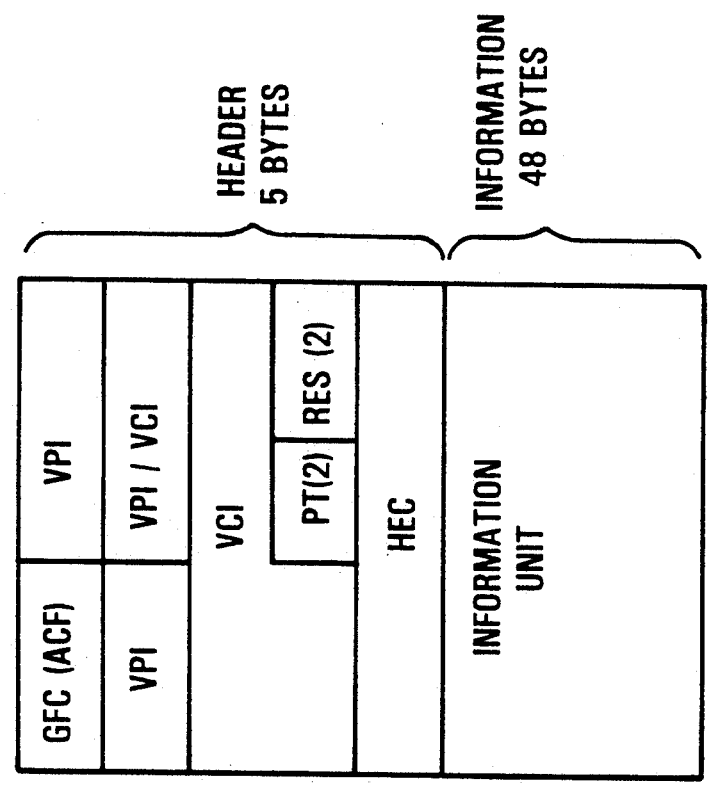
FIG. 2 shows a format of an embodiment of a test cell.

FIG. 1 A and 1B show a block diagram for explaining the principle of the present invention. FIG. 1A shows a block diagram for explaining the first principle where an on-line transmission line test is conducted during the operation of an asynchronous transmission mode (ATM) switching unit in the broadband ISDN.

In FIG. 1A, a test cell inserter/checker 7 inserts data exclusively comprising values of 1, for example, to an ATM cell according to a command of a central controlling unit 2 in an ATM switching unit 1, sends the test cell through an ATM switch 3 in the ATM switching unit 1 after inserting test data, and checks the test data in the test cell turned around or looped-back by an ATM layer 5 between the ATM switch 3 and a transmission line 4 for synchronous optical network (SONET), or by a subscriber's terminal adapter 6.

FIG. 1B shows a block diagram for showing the principle of the second embodiment and for explaining the principle of a transmission line testing system in the broadband ISDN where an off-line transmission test is conducted in an asynchronous transmission mode (ATM) switching unit with the communication through the switching unit 1 stopped.

In FIG. 1B, a test cell inserting/checking means 7, like in the first principle, inserts test data into ATM formatted cells according to a command of the central controlling unit 2 of the ATM switching unit, and then sends the test cell with test data inserted through the ATM switch 3 in the ATM switching unit 1.

The test cell is included in a test frame by the ATM layer 5 between the ATM switch 3 and the synchronous optical network (SONET) formatted transmission line 4, and then sent to the SONET-formatted transmission line 4. The test cell inserting/checking means 7 checks test data in the test frames turned around by a terminator 8 in the SONET-formatted transmission line 4 or by a network terminator 9 at a subscriber terminal in the SONET-formatted transmission line 4. The network terminator 9, not shown in FIG. 1A, is provided between the SONET-formatted transmission line 4 and the subscriber terminal adapter 6.

In FIG. 1A indicating the first principle of the present invention, a test cell sent by the ATM switch 3 is turned around by the ATM layer 5 or the subscriber terminal adapter 6. When a test cell is turned around by the subscriber terminal adapter 6, it is transmitted in a frame form in the SONET-formatted transmission line 4. However, as cells other than a test cell is not turned around, a transmission test is conducted in an on-line operation, that is, without stopping the operation of the ATM switching unit 1.

The ATM layer 5 and subscriber terminal adapter 6 are respectively provided with, for example, a test cell turnaround unit and checks a test cell sent by the ATM switch 3, thus ensuring the turnaround of the test cell to be turned around. A turnaround request is issued by a command of the central controlling unit.

FIG. 2 shows a format of an embodiment of a test cell. An ATM cell is used 'as is' as a test cell comprising a 5-byte header part and a 48-byte information part. The header part comprises GFC (ACF) to be used for flow-controlling a user network interface, a virtual path identifier (VPI), a virtual channel identifier (VCI), a payload type (PT) for indicating the VPI/VCI relation and the type of communication, reserved area (RES), and a header error control (HEC) for correcting a header error. The information part exclusively comprises values of 1, for example, as test data; where test data are held in a register, not shown in FIG. 4, in a test data inserter (shown in FIG. 4) for inserting test data. A test pattern can be prepared in any form that permits it to be recognized as test data.

Figure 3:
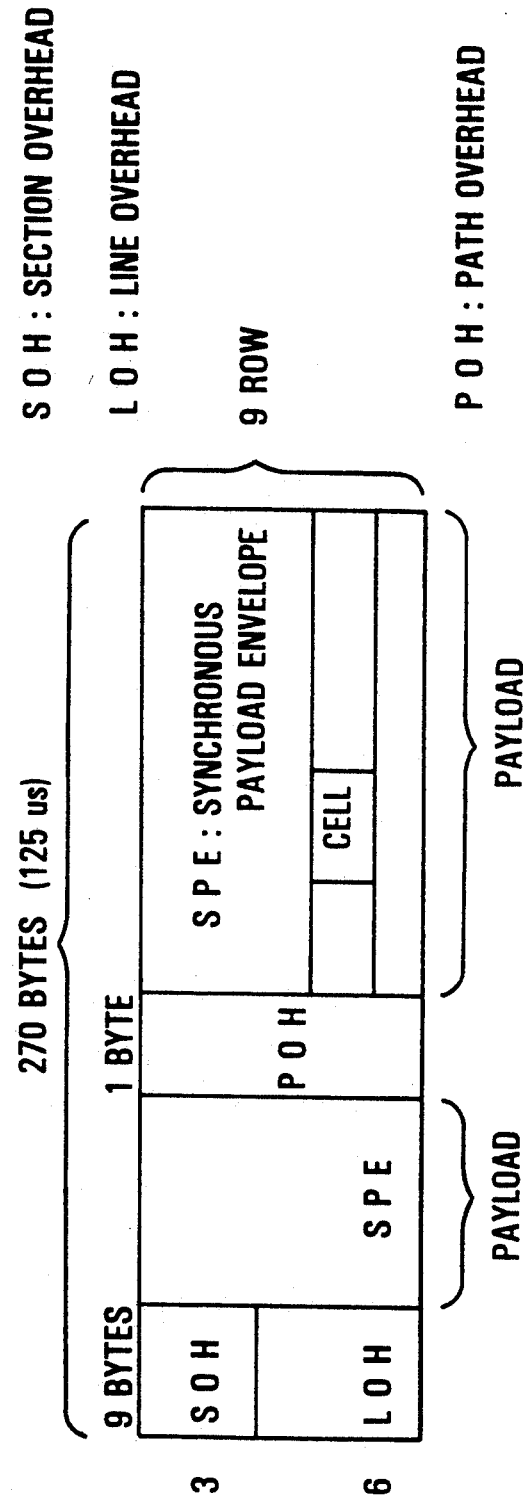
FIG. 3 shows a format of an embodiment of a test frame.

FIG. 3 shows an embodiment of a SONET-formatted test frame. A SONET-formatted frame comprises 270 bytes having a section overhead (SOH) for indicating the source of a frame, a line overhead (LOH) for indicating the destination of a frame, and a path overhead (POH). Other areas are used as synchronous payload envelopes (SPE) which are payloads as information fields.

As described above, after the insertion of test data by a test data inserter, a test cell is inserted to a payload area for a SONET-formatted frame by the ATM layer 5 through the ATM switch 3 in FIG. 1A, thus generating a test frame.

In FIG. 3, payloads on both sides of a path overhead (POH) are not specific ones, but are typically ATM cells laid compactly.

Figure 4:
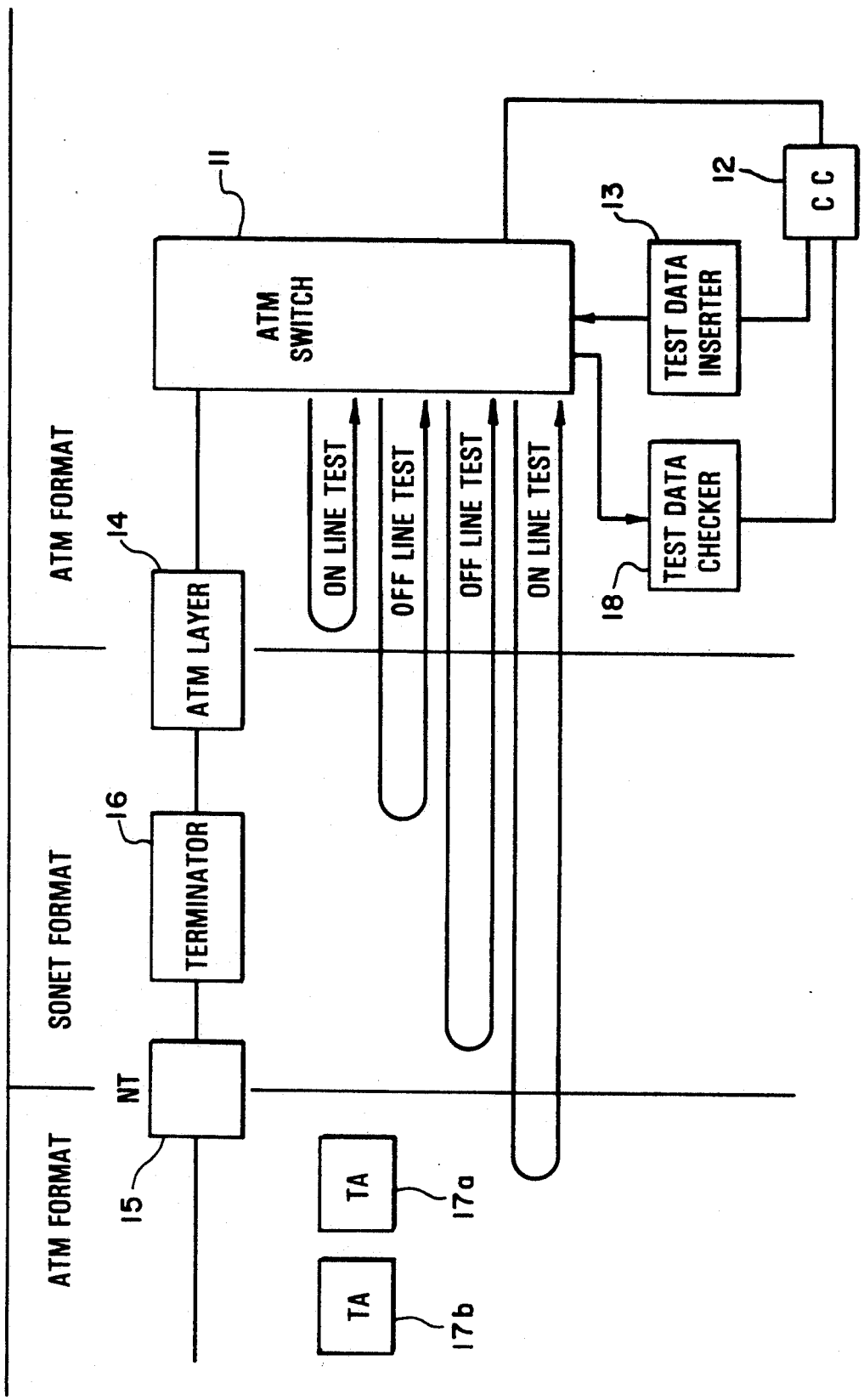
FIG. 4 shows a block diagram of a configuration of a broadband ISDN where the transmission test method of the present invention is adopted.

FIG. 4 shows a block diagram of a configuration of a broadband ISDN where the transmission test system of the present invention is adopted. In FIG. 4, a central controlling unit (CC) 12, a test data inserter 13 for inserting test data into an ATM cell, and a test data checker 18 for checking turned-around test data are connected to an ATM switch 11.

An ATM layer 14 for assembling an ATM cell into a SONET-formatted frame is provided between the ATM switch 11 and the synchronous optical network (SONET) transmission line. A network terminator (NT) such as a concentration unit 15 is connected to a subscriber terminal in a SONET-formatted transmission line where a terminator 16 for monitoring (detecting an error) a data relay and subscriber units is provided.

A plurality of subscriber terminal adapters (TA) 17a, 17b, for performing two-way switch between subscriber data and an ATM cell as an interface for a subscriber unit are connected to the network terminator (NT) 15, and a phone terminal, etc. is connected to each of the TAs.

In FIG. 4, test data exclusively comprising values of 1, for example, are inserted to ATM cells by the test data inserter 13 according to a command of the central controlling unit (CC) 12, and the test cells are sent through the ATM switch 11.

A test is performed such that a test cell is turned around by the ATM layer 14 in the test of the path to the ATM layer 14, and the content of the turned-around test cell is checked by the test data checker 18.

In the test of the transmission line to the subscriber terminal adapters (TA) 17a, 17b, ... connected to the subscriber, a test cell provided by the ATM switch 11 is formed as a SONET-formatted frame with a cell to be used for communication, and then turned around by the TA17a, 17b, ... through the network terminator 15. Then the test data checker 18 checks the test data. Before being applied again to the ATM switch 11, the turned-around test cell has tag information (for example, 1 byte) added to the header for indicating the destination of the cell, and according to the tag information the test cell is outputted to the test data checker 18.

On the other hand, while testing the transmission line to the terminator 16 in the SONET-formatted transmission line or to the network terminator 15, a SONET-formatted frame is to be turned around and the transmission line cannot be used for communication during this test. So the test is conducted in the off-line operation. As described above, in the transmission line test, a test cell into which test data is inserted by test data inserter 13 is inserted into a test frame by the ATM layer 14 through the ATM switch 11.

Figure 5:
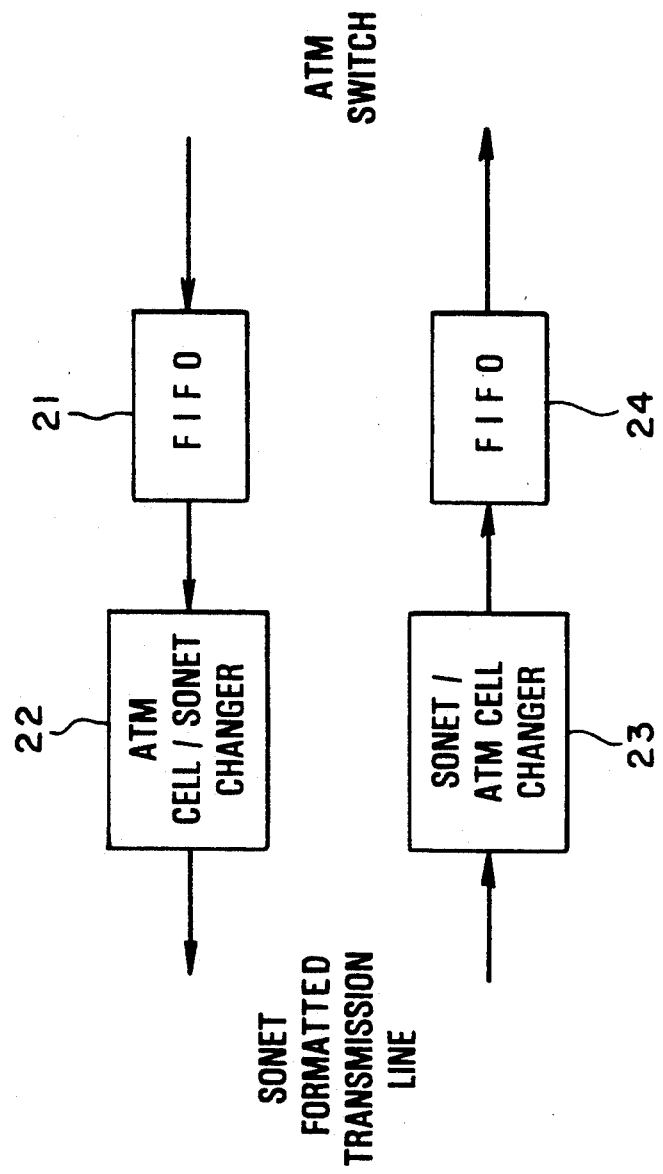
FIG. 5 shows a block diagram of a configuration of the ATM layer.

FIG. 5 shows a block diagram of a configuration of the ATM layer 14 shown in FIG. 4. The ATM layer 14 performs two-way conversion between an ATM formatted cell and a SONET-formatted frame, and comprises a first-in-first-out memory (FIFO) 21 for temporarily storing an ATM cell provided by the ATM switch 11 shown in FIG. 4, a changer 22 for outputting an ATM cell outputted by the FIFO 21 to the transmission line after converting it to a SONET-formatted frame, a changer 23 for converting an input frame provided from the SONET-formatted transmission line into an ATM cell, a FIFO 24 for temporarily storing an ATM cell provided by the changer 23 and then outputting it to the ATM switch 11.

Figure 6:
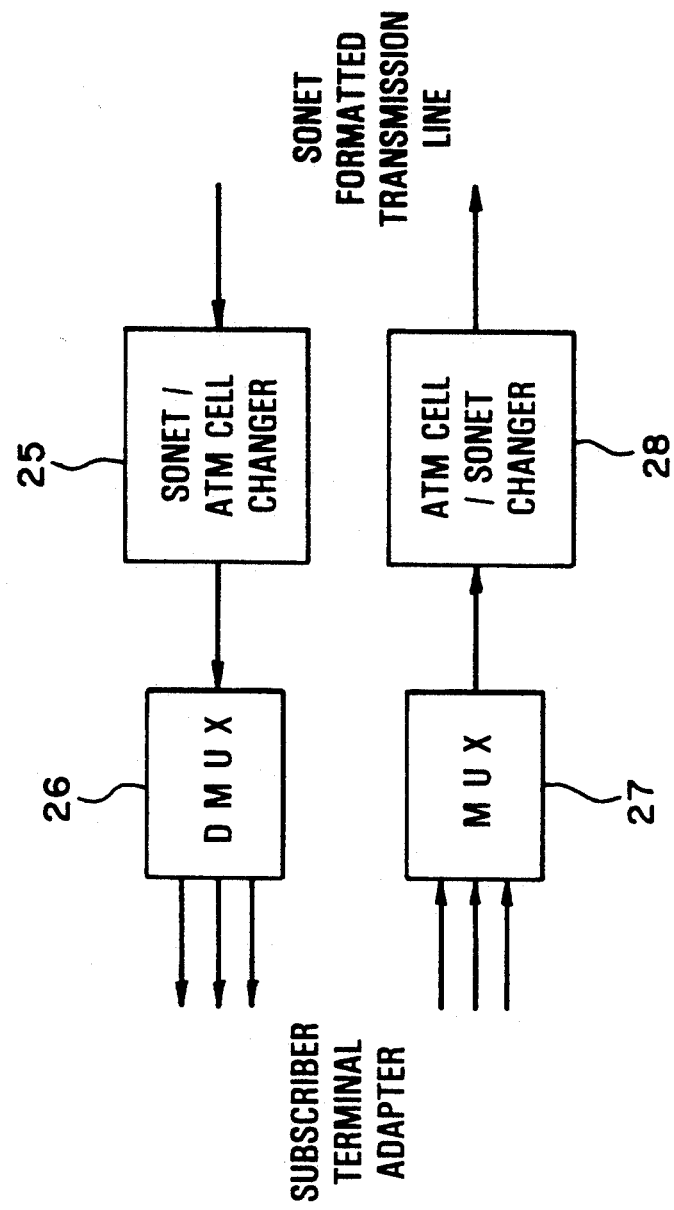
FIG. 6 shows block diagram of a configuration of the network terminator.

FIG. 6 shows block diagram of a configuration of the network terminator (NT) 15 shown in FIG. 4. The NT 15 performs two-way conversion between a SONET-formatted frame and an ATM cell, and comprises a changer 25 for converting a frame inputted from the transmission line to an ATM cell, a demultiplexer (DMUX) 26 for distributing ATM cells provided by the changer 25 to subscriber terminal adapters (TA) 17a, 17b, ..., a multiplexer (MUX) 27 for multiplexing an ATM cell to be provided by the TA, and a changer 28 for assembling the output provided by the multiplexer 27 into a SONET-formatted frame.

Figure 7:
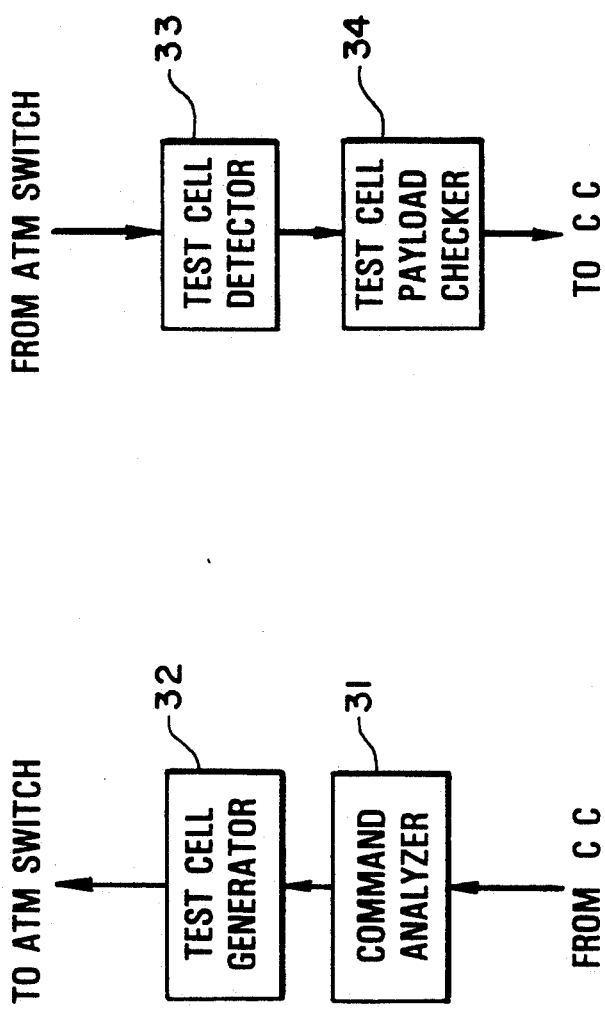
FIG. 7 shows a block diagram of a configuration of an embodiment of the test data inserter.

FIG. 7 shows a block diagram of a configuration of an embodiment of the test data inserter 13 shown in FIG. 4. In FIG. 7, the test data inserter 13 comprises a command analyzer 31 for receiving a send-a-test-cell command sent from the central controlling unit (CC) 12 of the switching unit, and a test cell generator 32 for sending a test cell to the ATM switch 11 according to a send-a-test-cell command issued by the command analyzer 31. The test cell sent by the test cell generator 32 can be distinguished from a normal data cell by a header VCI. Test data are inserted in the payload as an information part of a test cell, and then sent to the ATM switch.

Figure 8:
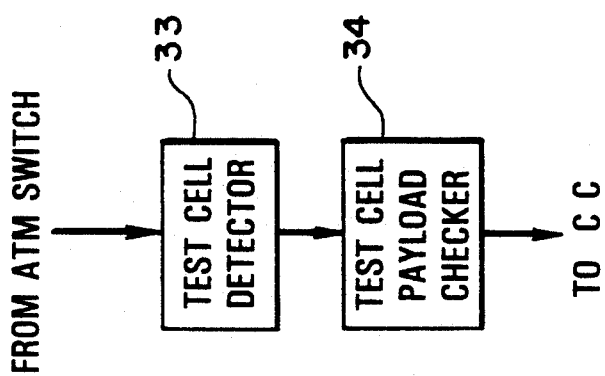
FIG. 8 shows a block diagram of a configuration of an embodiment of the test data checker.

FIG. 8 shows a block diagram of a configuration of an embodiment of the test data checker 18 shown in FIG. 4. In FIG. 8, the test data checker comprises a test cell detector 33 for analyzing the header of a turned-around test cell provided by the ATM switch 11, and extracts a test cell, and a test cell payload checker 34 for comparing the content of the payload of the extracted test cell with the content of the test cell as sent by the test cell generator 32 shown in FIG. 7 and then notifying the CC12 of the result of the transmission line test.

Figure 9:
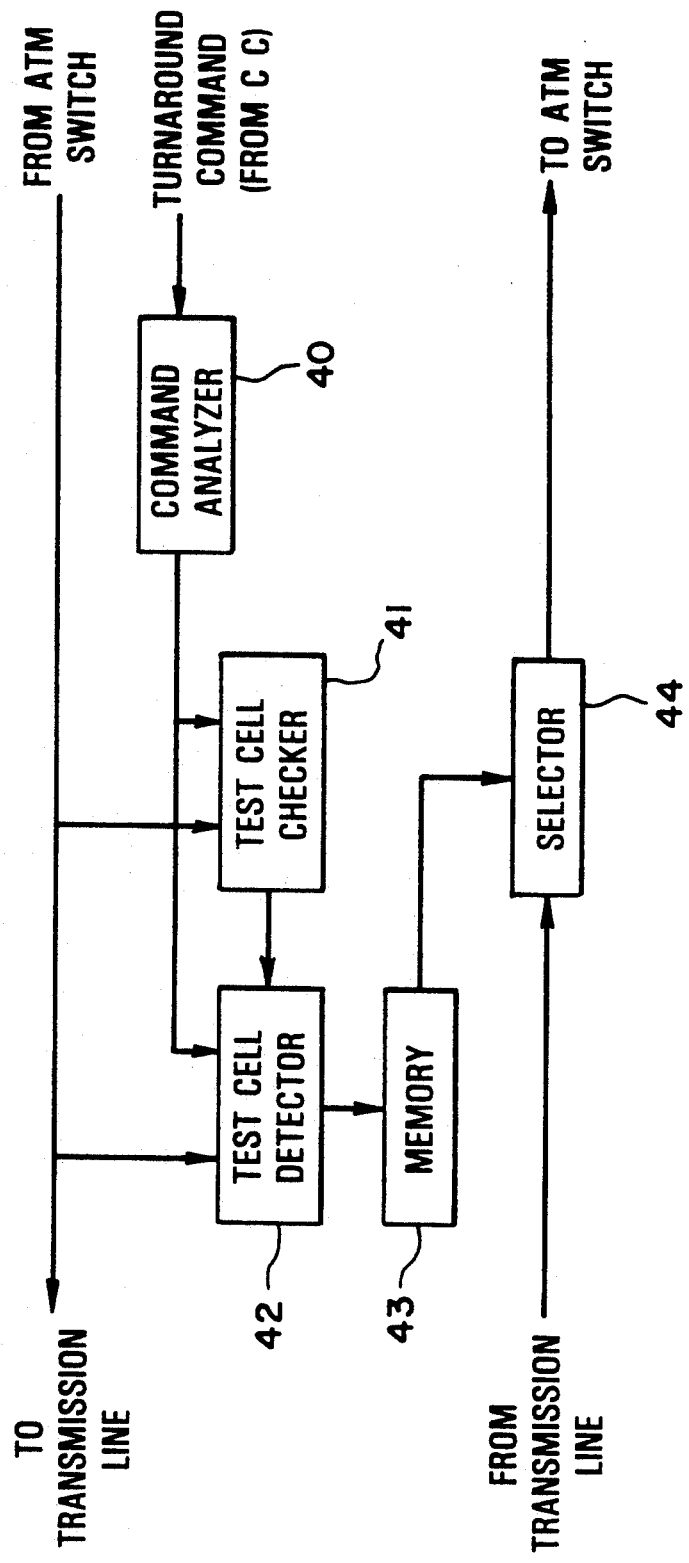
FIG. 9 shows a block diagram of a configuration of an embodiment of the test cell turnaround unit.

FIG. 9 shows a block diagram of a configuration of an embodiment of the test cell turnaround unit provided in the ATM layer 14 shown in FIG. 4 and in the subscriber terminal adapters (TA) 17a, 17b, .... In FIG. 9, the test cell turnaround unit in the ATM layer, for example, comprises a command analyzer 40 for receiving a turnaround-a-cell command transmitted by the central controlling unit (CC) 12 through a line different from the transmission line, a test cell checker 41 for monitoring the ATM cell transmitted by a command of the command analyzer 40, a test cell detector 42 for extracting the test cell by a command of the test cell checker 41, a memory 43 for temporarily storing the cell extracted by the test cell detector 42, and a selector 44 for turning around the test cell stored in the memory 43 to the ATM switch 11 at the time when a normal data cell to be transmitted in the opposite direction is not inputted therein.

Figure 10:
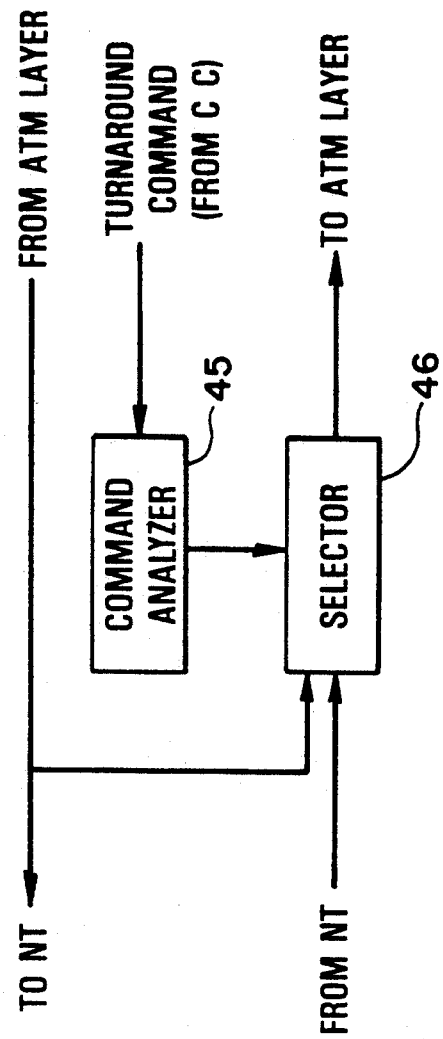
FIG. 10 shows a block diagram of a configuration of an embodiment of the test frame turnaround unit.

FIG. 10 shows a block diagram of a configuration of an embodiment of the test frame turnaround unit provided in the terminator 16 provided in the SONET-formatted transmission line, and in the network terminator (NT) 15 mounted at a subscriber terminal in the above described transmission line. For example, the test frame turnaround unit in the terminator 16 comprises a command analyzer 45 for inputting a turnaround command of the CC 12 of the switching unit, and a selector 46 for turning around a test frame according to a command of the command analyzer 45.

FIG. 11 shows an explanatory view for a format of an embodiment of the turnaround command sent by the central controlling unit of the switching unit to the test cell turnaround unit shown in FIG. 9 or to the test frame turnaround unit shown in FIG. 10. As described above, a turnaround command of the CC 12 is transmitted to each of the test cell turnaround units or to the test frame turnaround unit through a line different from the transmission line where a data cell is transmitted. The command format is generated such that a flag indicating the turnaround point following the heading pulse is set as shown in FIG. 11A. The content of the flag, that is, the turnaround point of a test cell or a test frame, is determined by the setting of the flag at one of four bits following the first bit announcing sending a test cell.

FIG. 12 shows a flowchart of an embodiment of a transmission line test method. In FIG. 12, when a send-test-data command is received from the central controlling unit (CC) of the switching unit in step (S) 50, the command is analyzed by the test data inserter in S51, and then the test cell is sent. The test cell is sent through the ATM switch in S52, and monitored by the test cell turnaround units or the test frame turnaround units at respective turnaround points in S53.

In FIG. 4, the test cell turnaround units or the test frame turnaround units provided in respective turnaround points such as the ATM layer 14, terminator 16 in the SONET-formatted transmission line, network terminator (NT) 15 at the subscriber terminal in the transmission line, subscriber terminal adapters (TA) 7a, 17b, ... are checked in S54 whether or not a turnaround is required by the turnaround command of the central controlling unit. If a turnaround is not to be made, test data are passed normally in S55, and the process is repeated from S53. In S54, if a turnaround is to be made, the test data are turned around in S56 and applied to the test data checker through the ATM switch 11.

The test data checker extracts the test data in S58, and checks whether or not they are equivalent to the test data sent in S59. If not equivalent, it detects a fault in the line up to the turnaround point. If equivalent, it detects no faults in S61 in the line up to the turnaround point, and the process is repeated from S50.

As described above, the present invention allows performing a transmission test in the broadband ISDN, and confirming in an on-line or off-line test up to which unit in the transmission line the transmission is performed normally.

In the present invention, information to be transmitted at a different speed, for example, voice, low speed data, animation, etc. can be processed collectively in an asynchronous transmission mode (ATM) in the broadband ISDN where continuous information and burst information can be processed in the same system.

What is claimed is:

1. A transmission line test system for use in a broadband integrated services digital network (ISDN) using an asynchronous transmission mode (ATM) switching unit with a central controlling unit and an ATM switch, comprising:
   a synchronous optical network (SONET) transmission line;
   an ATM layer provided between said ATM switch and said SONET transmission line;
   a subscriber terminal adapter connected to said SONET transmission line;
   means for inserting test data into an ATM cell according to a command of the central controlling unit of said ATM switching unit, to provide a test cell;

means for sending said test cell after the insertion of said test data through the ATM switch in said ATM switching unit;

a command transmission line provided separately from said SONET transmission line, for transmitting from the central controlling unit of said ATM switching unit to each of said ATM layer and said subscriber terminal adapter a test cell loopback command as a flag notifying of a loopback point of an ATM cell into which said test data are incorporated; and means for checking the test data turned around by said ATM layer or by said subscriber terminal adapter, to conduct an on-line transmission test during operation of said ATM switching unit.

2. A transmission line test system in a broadband ISDN according to claim 1, wherein
said test data inserting means comprises:
a test data inserter comprising a command analyzer for receiving a send-a-test-cell command from said central controlling unit and a test cell generator for sending said test cell to said ATM switch according to the instruction of said command analyzer, and said test cell checking means comprises:
a test data checker comprising a test cell detector for extracting a test cell turned around and outputted by said ATM switch and a test cell payload checker for checking the content of a payload as the information part of said extracted test cell.

3. A transmission line test system in a broadband ISDN according to claim 1, wherein
said ATM layer and subscriber terminal adapter respectively comprise a command analyzer for receiving a turnaround command from said central controlling unit, a test cell checker for checking whether or not an input cell is a test cell, and a test cell turnaround unit having a test cell detector for extracting said test cell, wherein a test cell is turned around when said test cell is inputted.

4. A transmission line test system according to claim 1 wherein said transmission line comprise a synchronous optical network formatted transmission line.

5. A transmission line test system in a broadband integrated services digital network (ISDN) using an asynchronous transmission mode (ATM) switching unit with a central controlling unit and an ATM switch, comprising:
a synchronous optical network (SONET) transmission line;
an ATM layer provided between said ATM switch and said SONET transmission line;
a terminator provided in the SONET transmission line;
a network terminator connected to said SONET transmission line;
means for inserting test data into an ATM formatted cell according to a command of said central controlling unit in said ATM switching unit, to provide a test cell;
means for sending said test cell after the insertion of said test data through an ATM switch in said ATM switching unit;
a command transmission line provided separately from said SONET transmission line, for transmitting from the central controlling unit of said ATM switching unit to each of said terminator and said network terminator a test frame loopback command as a flag notifying of a loopback point of a test frame configured by said ATM layer as containing said test cell; and means for checking said test data which are generated as containing said test cell by said ATM layer in a test frame turned around by the terminator in said SONET transmission line or by the network terminator at a subscriber terminal in the SONET transmission line, to conduct an off-line transmission line test with communication by said ATM switching unit stopped.

6. A transmission line test system in a broadband ISDN according to claim 5, wherein
said test cell inserting/checking means comprises:
a test data inserter comprising a command analyzer for receiving a send-a-test-cell command from said central controlling unit and a test cell generator for sending said test cell to said ATM switch according to the instruction of said command analyzer, and
a test data checker comprising a test cell detector for extracting a test cell turned around and outputted by said ATM switch and a test cell payload checker for checking the content of the payload as the information part of said extracted test cell.

7. A transmission line test system in a broadband ISDN according to claim 5, wherein
said terminator in the SONET-formatted transmission line and said network terminator at a subscriber terminal in the SONET-formatted transmission respectively comprise a command analyzer for receiving a test frame turnaround command from said central controlling unit, and a test frame turnaround unit having a selector for turning around a test frame according to said command analyzer.

8. A transmission line test method for use in a broadband integrated services digital network (ISDN) using an asynchronous transmission mode (ATM) switching unit, comprising the steps of:
inserting test data to an ATM cell to provide a test cell, according to a command of a central controlling unit of said ATM switching unit;
sending said test cell after the insertion of said test data through an ATM switch in said ATM switching unit; and
checking the test data turned around by an ATM layer provided between said ATM switch and a synchronous optical network (SONET) transmission line or by a subscriber terminal adapter coupled to the SONET transmission line, to conduct an on-line transmission test during the operation of said ATM switching unit.

9. A transmission line test method for use in a broadband integrated services digital network (ISDN) using an asynchronous transmission mode (ATM) switching unit having a central controlling unit and an ATM switch, comprising the steps of:
inserting test data into an ATM formatted cell to provide a test cell, according to a command of said central controlling unit in said ATM switching unit;
sending said test cell after the insertion of said test data through an ATM switch in said ATM switching unit; and
checking said test data which are generated as containing said test cell by an ATM layer provided between said ATM switch and a synchronous optical network (SONET) transmission line, in the test frame turned around by a terminator in said SONET transmission line or by a network terminator at a subscriber terminal in the SONET transmission line, to conduct an off-line transmission line test with communication by said ATM switching unit stopped.

* * * * *